UNITED STATES PATENT OFFICE.

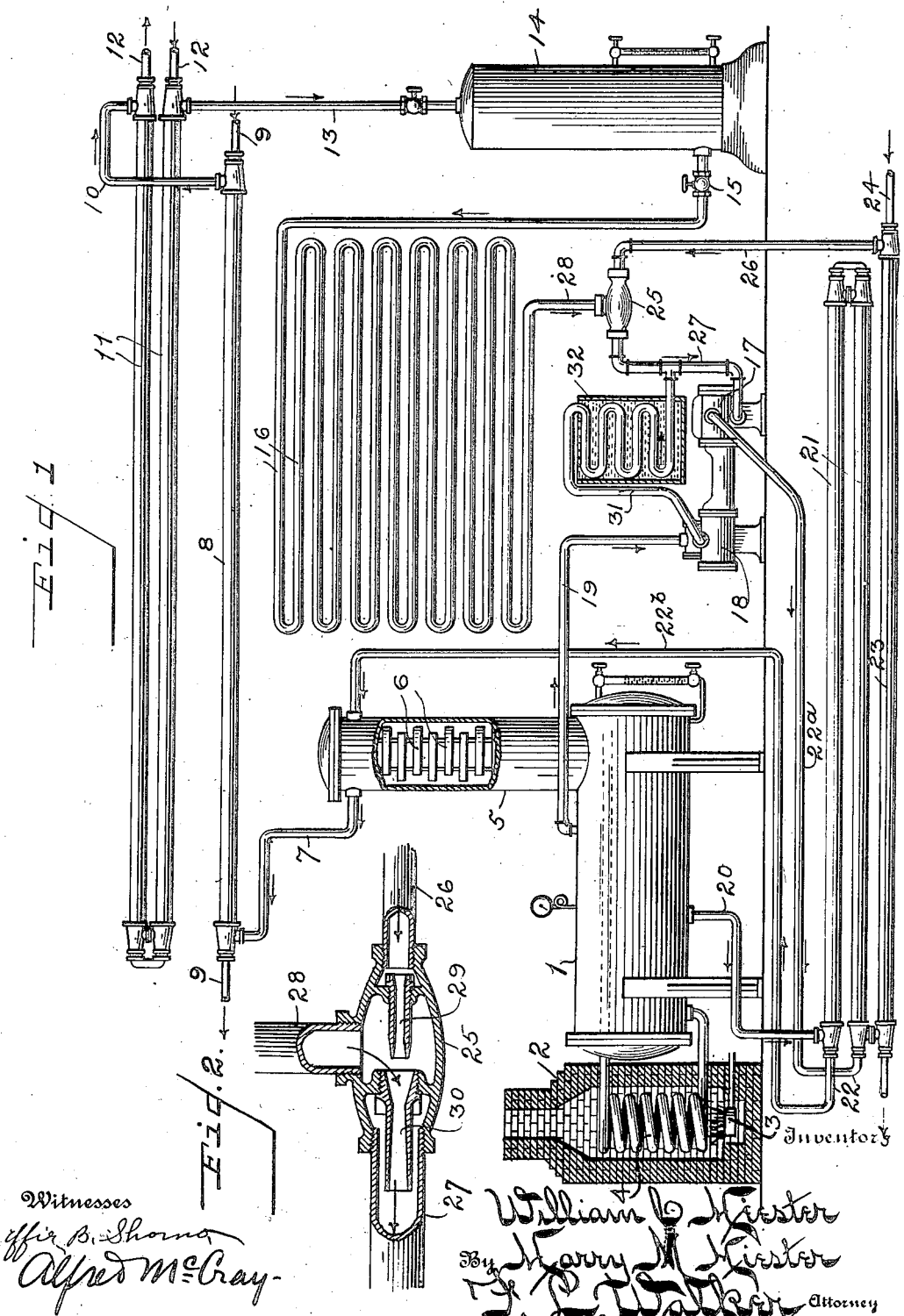

HARRY M. HIESTER AND WILLIAM C. HIESTER, OF DAYTON, OHIO.

REFRIGERATING APPARATUS.

1,134,269.  Specification of Letters Patent.  Patented Apr. 6, 1915.

Application filed September 21, 1912. Serial No. 721,699.

*To all whom it may concern:*

Be it known that we, HARRY M. HIESTER and WILLIAM C. HIESTER, both citizens of the United States, residing at Dayton, in the county of Montgomery and State of Ohio, have invented certain new and useful Improvements in Refrigerating Apparatus, of which the following is a specification.

Our invention relates to refrigerating apparatus and particularly to improvements in refrigerating systems of the absorption type.

The object of the invention is to simplify the construction as well as the means and mode of operation of such refrigerating apparatus whereby it will not only be cheapened in construction but will be more efficient in use, easily and economically operated and unlikely to get out of repair.

A further object of the invention is to provide improved means for combining the expanded gas and weak liquor and for ejecting or sucking the expanded gases by force from the expansion coils whereby the efficiency of the system will be increased through the increased vaporization of the anhydrous ammonia in the expansion coils due to the decreased pressure.

A further object is to conserve the heat generated by the absorption of the ammonia gases by the weak liquor by returning the strong hot liquor directly to the generator.

A further object is to provide a self contained apparatus obviating the necessity of a separate power plant by employing the ammonia vapors from the generator to operate the pump, the exhaust being returned to the generator with the strong liquor.

With the above primary and other incidental objects in view as will more fully appear in the specification, the invention consists of the features of construction, the parts and combinations thereof and the mode of operation or their equivalents as hereinafter described and set forth in the claims.

In the accompanying drawings, Figure 1 is a view somewhat diagrammatic of the complete system of refrigerating apparatus of the absorption type embodying the present invention. Fig. 2 is a detail sectional view of the ejector or combiner by which the expanded gases and weak liquor are admixed.

Like parts are indicated by similar characters of reference throughout the several views.

The absorption process of refrigeration to which the present invention relates consists essentially in distilling from a mixture of ammonia and water known as strong liquor, ammonia vapor from which the water vapor or moisture is subsequently extracted, then condensing the anhydrous ammonia gases to liquid ammonia which later in the process is permitted to expand in a series of expansion coils arranged in a refrigerator, chill room or in a brine tank. From the gases liberated from the aqua ammonia in the generator anhydrous ammonia is distilled by the usual method of passing it through an analyzer, a rectifier and a condenser. It is to be understood that as the ammonia gases are changed from a vapor to a liquid in the condenser they give up their latent heat and upon a subsequent expansion of the gases in the expansion coils within the radiators, chill rooms or brine tanks, the expanding gases will absorb a fixed quantity of heat from the surrounding body of air or brine. After having been expanded in the chill room, the heated or expanded gases are brought into contact with a body of weak liquor with which the gases combine due to their great affinity for water. The weak liquor thus heavily charged with ammonia is changed into strong liquor which is pumped back to the generator to again undergo the same sequence of operations.

Referring to the drawings, 1 is the generator sometimes known as the still or ammonia boiler. The liquor within the generator may be heated by means of steam coils within the boiler or in any other suitable manner but in the drawing there has been shown a retort 2 having in the lower portion thereof a gas burner 3 above which is located a coil of pipe 4 communicating with the interior of the generator 1. The liquor passes from the generator 1 into the coil 4 at the bottom thereof where it is heated to a point of vaporization. The super-heated vapor returns to the generator from the top of the coil 4.

The product of distillation as it emerges from the generator is not anhydrous ammonia gas but is a mixture of ammonia gas and water vapor or steam. From the generator the products of distillation pass through the analyzer 5. The analyzer 5 may be constructed separate from the generator and connected thereto by a suitable conduit but is preferably formed integral with the generator, projecting perpendicular therefrom as shown in the drawings.

The analyzer 5 comprises a shell or casing within which are located one above the other a series of baffle plates or pans 6. The supply of strong liquor to the generator is discharged through the top of the analyzer and passes thence downward therethrough, passing from pan to pan and enters the generator at the bottom of the analyzer. The strong liquor thus passing downward through the analyzer meets the products of distillation passing in the opposite direction or upward around the baffle plates or pans 6.

Inasmuch as the products of distillation are passing from the generator to be cooled and the strong liquor is being returned to the generator to be re-heated it is desirable that the heat units thereof be interchanged which is accomplished by this intermingling of the products of distillation and the returning strong liquor. The analyzer thus serves as an economizer effecting an exchange of heat between the outgoing products of distillation and incoming strong liquor, lowering the temperature of the former and raising the temperature of the latter.

The partial cooling of the products of distillation during their upward passage through the analyzer results in the condensation and deposit of a portion of the water vapor or moisture. At the same time the heating of the strong liquor by the products of distillation causes the strong liquor to give off vapor which joins the vapor from the generator on its way to the rectifier and condenser. As before stated the products of distillation are not anhydrous ammonia gas but a mixture of ammonia gas and water vapor from which it becomes necessary to purge the moisture or water vapor. From the analyzer 5 the products of distillation are carried through the conduit 7 to the rectifier 8. Its function is to rectify the gas from the generator so that it is practically pure anhydrous ammonia gas. The rectifier comprises one or more pipes of comparatively large size through the center of each of which extends a water conduit 9. The ammonia vapors are circulated within the pipe 8 about the outside of the water conduit 9 extending therethrough. Cold water is circulated through the conduit 9 in a direction opposite to the direction of circulation of the ammonia gases and water vapors in the pipe 8. The chilling of the products of distillation by their contact with the cold water conduit 9 causes the deposit of the moisture or water vapor carried thereby which moisture is drained back through the conduit 7 to the analyzer 5 and thence to the generator. The remaining gas as it passes through the conduit 10 to the condenser 11 is substantially pure anhydrous ammonia. The condenser 11 is constructed in a manner similar to the rectifier 8 and comprises a plurality of pipes of comparatively large size through the center of each of which extends a cold water conduit 12. The ammonia gases are circulated through the pipes 11 about the exterior of the water conduits 12 while cold water is passed through the conduits 12 in a direction opposite to the flow of the ammonia gases in the pipes 11. During its passage through the condenser 11 the ammonia gas is cooled below its point of vaporization and thereupon liquefied, at the same time losing its latent heat. The liquid ammonia thus produced is conducted through the conduit 13 to the ammonia receiver 14 which comprises a simple reservoir for the storage of the liquid ammonia. From the ammonia receiver 14 the liquid ammonia passes through the expansion valve 15 into the series of expansion coils 16 which in practice are located within the refrigerator, chill room or brine tank. The ammonia as it passes through the expansion valve 15 is partially evaporated by the great reduction in its pressure and as it circulates through the expansion coils 16 the anhydrous ammonia boils and evaporates into an ammonia vapor by the latent heat taken up in cooling the air or brine. After having been circulated through the expansion coils 16 and having received its full quota of heat the heated or expanded gases are combined with weak liquor and returned to the generator as hereinafter described.

To provide for returning the spent gases to the generator there is provided a pump having a pumping chamber 17 and an actuating chamber 18. The system as herein described is self contained obviating the necessity of a separate power plant for operating the pump. The liberated gases from the generator are employed for driving the liquor pump. A vapor conduit 19 leads from the generator to the actuating chamber 18 of the pump. This conduit 19 conveys from the generator to the pump chamber 18 steam under pressure but which is mixed more or less with ammonia gas to operate the pump. A supply of weak liquor is forced from the generator by the gas pressure therein and is brought into contact with the expanded gases, becoming charged therewith is converted into strong liquor which is returned to the generator through the analyzer by the action of the pump. This weak liquor supply is drawn from the generator 1 through the conduit 20. Inasmuch as the expanded gases will more readily combine with a cold weak liquor than with hot liquor it is desirable that the supply of weak liquor be cooled before the ammonia gas is received. At the same time it is desirable that the strong liquor or that after having been charged with the expanded gases be pre-heated before its re-introduction into the generator through the analyzer. It is therefore to be desired that the heat units of the weak liquor and strong liquor be interchanged which is accomplished by means of an exchanger 21. The exchanger 21 is constructed in a manner similar to the rectifier and condenser and comprises a plurality of pipes of comparatively large diameter having inner central longitudinally disposed conduits 22 extending therethrough. The weak or hot liquor is circulated through the exterior pipes 21 and about the inner conduit 22 while the colder or strong liquor is circulated through the inner conduits 22 in a direction opposite to the movement of the weak liquor. By this arrangement the weak liquor will be materially cooled before being brought to the point of its combination with the expanded gases while at the same time the strong or gas charged liquor will be materially heated prior to its re-introduction to the generator. To further cool the weak liquor before introducing the expanded gases it is conducted through a cooler 23, similar in construction to the rectifier, having a central cold water conduit 24 conveying water in a direction opposite to the flow of liquor. The cool weak liquor is conducted through a conduit 26 from the cooler 23 to the ejector or combiner 25 which acts as a siphon due to the passage of the liquor therethrough. The action of ejector or combiner is to suck or siphon all the expanded gases from the expansion coils thereby increasing the efficiency of the apparatus.

The ejector or combiner 25 is shown in detail in Fig. 2. This combiner comprises a chamber with which the conduit 26 connects at the intake side and having an outtake conduit 27 leading to the pump chamber 17 connected at its opposite side and in alinement with the inlet conduit 26. The spent gas conduit 28 enters the chamber 25 in a position substantially at right angles to the inlet and outlet conduits 26 and 27 and substantially midway between the inlet and outlet orifices of the combiner. A nozzle 29 is provided at the intake side of the combiner which discharges into a second nozzle 30 at the outlet side thereof. The nozzle 29 is adapted to discharge a jet of weak liquor under pressure across the terminus of the gas conduit 28. The passage of a strong current of weak liquor from the nozzle 29 to the nozzle 30 will facilitate the absorption of the expanded gases which when drawn into the ejector are absorbed by the weak liquor thereby dispensing with the usual form of absorber. The discharge of a given volume of weak liquor in the form of a jet of small diameter affords a surface of contact of the gases of vast extent, far greater than that afforded by the usual form of tank absorber. The momentum of this jet of weak liquor serves to exhaust from the extension coils a volume of expanded gases in excess of that which may be naturally absorbed by the weak liquor, the unabsorbed unexpanded gases being carried with the current of rich liquor back to the generator. Furthermore, the ejector serves to keep the rich liquor and the weak liquor separated, whereby the heat generated by the absorption of the gases will not be transmitted to the weak liquor, the absorption power would be impaired thereby and furthermore the supply of weak liquor will not be contaminated by the rich liquor therefore the supply of weak liquor at the point of absorption will be afforded at a constant density. By the addition of the expanded gases the weak is converted into a strong liquor. By varying the pressure of the jet of weak liquor as it is discharged across the terminus of the gas conduit more or less suction may be induced upon the expansion coils 16 thereby further lowering the pressure upon the ammonia gas as it passes through the expansion valve 15 causing a more rapid vaporization of the ammonia and causing it to act more quickly and to take up a greater quantity of heat from the air or brine. It is thus possible to attain any desired degree of suction. It is possible by this construction to maintain a vacuum of low degree in the expansion coils which is ordinarily impossible in apparatus not employing a gas compressor.

As before stated the conduit 27 conducts the strong liquor which is the previous cooled weak liquor charged with the hot ammonia gases to the pump chamber 17. However, the strong liquor will be delivered from the ejector or combiner to the pump under pressure. The conduit 27 intermediate the combiner 25 and pump chamber 17 is joined by the exhaust pipe 31 by which the exhaust vapor from the actuating chamber 18 of the pump is returned to the generator through the conduit 27 and pump chamber 17. The exhaust pipe 31 is preferably extended through a tank 32 of water or through some other cooling device whereby the exhaust vapors are condensed before being introduced into the conduit 27. From the pump chamber 17 the strong liquor is conveyed through the conduit 22ª to the conduits 22 which as before described extend centrally through the exchanger 21. From the conduits 22 of the exchanger 21 the strong liquor further heated by its passage through the exchanger is carried through the conduit 22ᵇ to the analyzer through which it is discharged downward over the baffle plates or pans 6 as before mentioned to the generator. It will be thus seen that there is provided from the generator 1 two complete circuits; a gas circuit extending through the analyzer 5, the conduit 7, the rectifier 8, the condenser 11, the receiver 14 and the expansion coils 16 to the combiner 25 and a liquor circuit extending from the generator 1 through the conduit 20, the exchanger 21, the cooler 23 and the conduit 26 to the combiner 25. From the combiner 25 the liquor circuit and gas circuit have common returns through the conduit 27 the pump chamber 17 and the conduits 22ª, 22 and 22ᵇ to the analyzer and through the analyzer back to the generator.

Inasmuch as the hot strong liquor is returned from the ejector or combiner 25 to the generator, with all the heat of the expanded gases and that this hot strong liquor is further heated by its passage through the exchanger 21 it is obvious that a great saving in fuel for the operation of the generator is effected, since none of the heat units are lost as is the case when an absorber of the usual type is employed. The ejector serves to produce a forced suction on the expansion coils which increases the efficiency of the coils. The strong liquor is delivered to the pump under the influence of the generator pressure thereby reducing the power necessary to operate the pump. The contact of the expanded gases in the ejector or combiner with the rapidly moving stream of weak liquor effects a more thorough absorption of the gases than the ordinary form of absorber heretofore used.

It is to be noted that the present system dispenses with the usual form of absorber which requires the constant cooling of the strong liquor before its return to the generator, thereby conserving the heat units which with the usual form of absorber would be lost. By the use of the ejector or combiner a stronger liquor of higher temperature is delivered to the pump under pressure, from which it is returned to the generator without cooling thereby enabling a generator of smaller size to be utilized.

From the above description it will be apparent that there is thus produced a device of the character described possessing the particular features of advantage before enumerated as desirable but which obviously is susceptible of modification in its form, proportion, detail construction and arrangement of parts without departing from the principle involved or sacrificing any of its advantages.

While in order to comply with the statute, the invention has been herein described in language more or less specific as to certain structural features, it is to be understood that the invention is not limited to any specific details but that the means and mechanism herein shown and described comprise but one mode of putting the invention into effect and the invention is therefore claimed broadly in any of its possible forms or modifications within the scope of the appended claims.

Having thus described our invention, we claim;

1. In a refrigerating apparatus, a generator, expansion coils, a weak liquor conduit leading from the generator, with which the outlet extremity of the expansion coils communicates and through which the weak liquor is circulated by the gas pressure within the generator, the said conduit continuing from the juncture of the expansion coils and the liquor conduit, a hot vapor driven pump, with which such continuation of the weak liquor conduit communicates and to which the hot rich liquor is supplied through such continuation under the influence of the gas pressure within the generator, said hot vapor driven pump being adapted to return to the generator the rich liquor formed by the mixing of the weak liquor and the expanded gases and supplied thereto under pressure through the extension of the weak liquor conduit, and a hot vapor conduit leading from the generator to the pump for conveying hot vapors thereto, by which the pump is operated to return the rich liquor to the generator, substantially as specified.

2. A refrigerating apparatus including a generator, expansion coils, a pump operating to return to the generator the rich liquor resulting from the combination of the weak liquor and expanded gases, a hot vapor conduit leading from the generator to the power end of the pump, an exhaust conduit leading from the power end of the pump and discharging into the suction end thereof whereby the pump exhaust is returned to the generator.

3. In a refrigerating apparatus, a generator, expansion coils, a weak liquor conduit leading from the generator with which the expansion coils communicate, a hot vapor driven pump adapted to return the rich liquor formed by the mixing of the weak liquor and the expanded gases to the generator, a hot vapor conduit leading from the generator to the pump for conveying hot vapors thereto, by which the pump is operated to return the rich liquor to the generator and an exhaust conduit from the power end of the pump thence through a condenser and discharging through the operating end of the pump with the rich liquor to the generator.

4. A refrigerating apparatus including a generator, expansion coils, a weak liquor supply conduit, a pump operated by vapors from the generator to return to the generator the rich liquor resulting from the combination of the weak liquor and expanded gases, a condenser for the vapors exhausted by the pump and a connection whereby the condensed exhausted vapors from the pump are reintroduced into the generator with the rich liquor.

5. In a refrigerating apparatus, a generator, a gas conduit leading from the generator, a rectifier, a condenser, and expansion coils included in said gas conduit, a weak liquor conduit leading from the generator, a nozzle in said weak liquor conduit adapted to discharge a jet of weak liquor under generator pressure across the terminus of the gas conduit whereby the gas is forcibly withdrawn from the gas conduit and combined with the jet of weak liquor, a pump to which the enriched liquor is supplied under generator pressure, said pump being adapted to return the liquor to the generator, and a hot vapor supply conduit leading from the generator to the pump whereby the pump will be operated by hot vapors generated in said generator, and an exhaust conduit from the pump motor discharging into the liquor conduit, substantially as specified.

6. In a refrigerating apparatus, a generator, a pump operated by gas vapors from the generator for supplying rich liquor to the generator, a condenser for the pump exhaust and a connection whereby the condensed exhaust is returned through the pump to the generator.

7. In a refrigerating apparatus, a generator, a weak liquor supply conduit, a gas conduit communicating therewith, a pump to which the hot liquor resulting from the absorption of the gases by the weak liquor is supplied under the influence of the generator pressure, a hot gas conduit leading from the generator to the pump, a return conduit from the pump to the generator through which the hot liquor is returned in a heated condition to the generator under the influence of the pump, and an exhaust conduit from the power to the suction end of the pump through which the pump exhaust is returned to the generator with the rich liquor.

In testimony whereof, we have hereunto set our hands this 14th day of September A. D. 1912.

HARRY M. HIESTER.
WILLIAM C. HIESTER.

Witnesses:
THEODORE C. LINDSEY, Jr.,
EFFIE B. LUTTRINGER.